United States Patent [19]

Neeff, deceased et al.

[11] Patent Number: 4,614,547

[45] Date of Patent: Sep. 30, 1986

[54] AZINE PIGMENTS

[75] Inventors: Rütger Neeff, deceased, late of Leverkusen, Fed. Rep. of Germany, by Käte Neeff, heiress; Meinhard Rolf; Walter Müller, both of Leverkusen, Fed. Rep. of Germany

[73] Assignee: Bayer Aktiengesellschaft, Leverkusen, Fed. Rep. of Germany

[21] Appl. No.: 767,220

[22] Filed: Aug. 19, 1985

[30] Foreign Application Priority Data

Aug. 22, 1984 [DE] Fed. Rep. of Germany ....... 3430800

[51] Int. Cl.$^4$ ................................................ C09D 5/00
[52] U.S. Cl. .......................... 106/288 Q; 106/288 R; 106/309; 548/105; 546/6
[58] Field of Search .............. 106/288 R, 288 Q, 309; 548/105; 542/417

[56] References Cited

U.S. PATENT DOCUMENTS

| 3,960,868 | 6/1976 | Ferrini et al. ........................ 564/169 |
| 3,963,708 | 6/1976 | L'Eplattenier et al. ............ 549/210 |
| 4,355,159 | 10/1982 | Iqbal et al. ........................ 548/105 |
| 4,460,768 | 7/1984 | Iqbal et al. ........................ 106/288 Q |

Primary Examiner—Paul Lieberman
Assistant Examiner—Willie J. Thompson
Attorney, Agent, or Firm—Sprung, Horn, Kramer & Woods

[57] ABSTRACT

Pigments which, in one of their tautomeric forms, have the formula

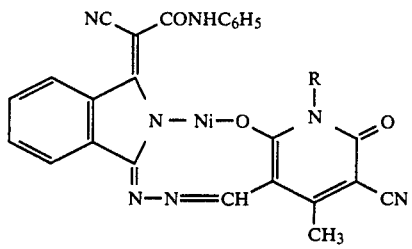

in which
R signifies —$CH_3$ or

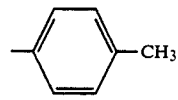

and which, in the event that R is —$CH_3$, are present in the β-modification which is characterized by the lattice plane spacings d/Å 13.33, 12.67, 9.17 and 15.15 having the relative intensities 100, 100, 60 and 2%, process for their preparation and their use.

9 Claims, No Drawings

AZINE PIGMENTS

The invention relates to azine pigments which, in one of their possible tautomeric forms, have the formula (I)

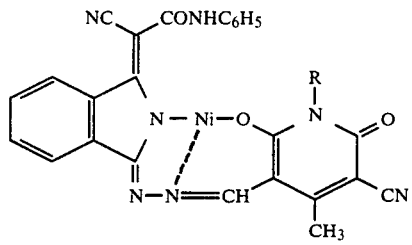

in which
R signifies —CH₃ or

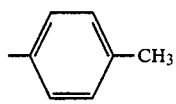

and which, in the event that R is=—CH₃, are present in the β-modification which is characterised by the lattice plane spacings d/Å 13.33, 12.67, 9.17 and 15.15 having the relative intensities 100, 100, 60 and 2%, to a process for their preparation and to their use.

It has also been possible to prepare two modifications of the pigment of the formula (I) where R=

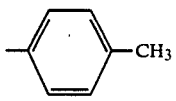

the β-modification being characterised by the lattice plane spacings d/Å 13.07, 12.43, 15.75 and 3.28 having the relative intensities 100, 100, 70 and 60% and the α-modification having the lattice plane spacings d/Å 10.92, 3.81, 3.17 and 12.89 having the relative intensities 100, 80, 40 and 5%.

The indicated lattice plane spacings have been calculated from the 4 intensifiers of the corresponding DEBYE-SCHERRER diagrams (wavelength 1.54 Å, Cu-Kα-radiation).

The new pigment of the formula (I) wherein R stands for methyl can be preferably characterised by the DIN 5,033 standard tristimulus values X=26.64, Y=15.36 and Z=4.09 and a hue angle of 33.7°. It has a red hue which, in the Colour Index hue indication chart, corresponds approximately to indicator number 8 (β-modification).

The new pigment of the formula (I) wherein R stands for p-tolyl can be preferably characterised by the DIN 5,033 standard tristimulus values X=25.75, Y=15,00 and Z=4.25 and a hue angle of 33.3°. It has a red hue which, in the Colour Index hue indication chart, corresponds approximately to indicator number 8 (β-modification).

The novel α-modification of the new pigment of the formula (I) wherein R stands for p-tolyl is characterised by the DIN 5,033 standard tristimulus values X=32.40, Y=20.04 and Z=4.13 and a hue angle of 41.0°. It has a red hue which, in the Colour Index hue indication chart, corresponds approximately to indicator number 7.

The new pigments can be prepared by a number of available methods.

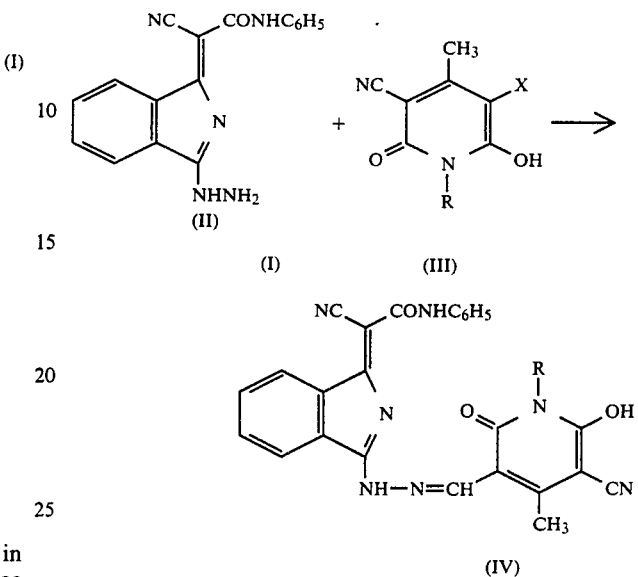

The hydrazone (II) is condensed with the aldehyde or an optionally substituted aldehyde-anil of N-methylpyridone or N-p-tolylpyridone (III, X=CHO or CHNAr, where Ar signifies an optionally substituted phenyl radical) to form the azines (IV) which are then converted with a nickel salt into the red pigments (I). The reaction of (II) with (III) is advantageously carried out at temperatures between 60° and 150° C. in an organic solvent, if desired under pressure. Suitable organic solvents are alcohols, such as methanol, ethanol, n-butanol, ethylene glycol, ethylene glycol monomethyl ether, ethylene glycol monoethyl ether or benzyl alcohol, aromatics, such as toluene, xylene, chlorobenzene, 1,2-dichlorobenzene, nitrobenzene or pyridine, or aprotic solvents, such as dimethylformamide, N-methylpyrrolidone, dimethylacetamide, dimethyl sulphoxide or tetramethylene sulphone.

Possible substituents for the aniline moiety of the aldehyde-anil (III) are halogen, such as chlorine or bromine, alkyl, in particular $C_1$-$C_4$-alkyl, preferably methyl, alkoxy, in particular $C_1$-$C_4$-alkoxy, preferably methoxy, and nitro. The aniline moiety of the aldehyde-anil is preferably unsubstituted, but it can also carry for example 1 or 2 substituents. To effect the subsequent metallisation, (IV) can be isolated and be advantageously reacted at temperatures of 60°-150° C. with a nickel salt in one of the abovementioned forms. The nickel salt can be the acetate, formate, carbonate, sulphate, chloride or nitrate.

The metallisation may be followed by a heat treatment in water or one of the abovementioned solvents. To this end, either the raw pigment of the formula (I) can be isolated and, if desired after drying in the same solvent or in water or in another solvent, can be kept at temperatures of 100°-250° C. for 2-20 hours, if desired under pressure, or after the metallisation the reaction batch is heated without isolation at 100°-250° C. for 2-20 hours.

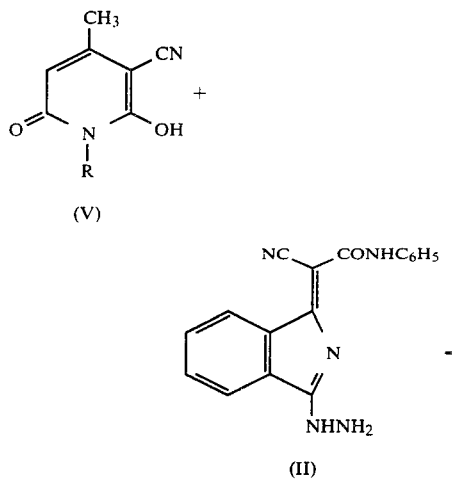

(V)

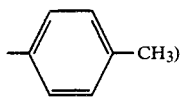

(II)  (IV)

It is also possible to condense 3-cyano-6-hydroxy-1,4-dimethylpyrid-2-one or 3-cyano-6-hydroxy-4-methyl-1-p-tolylpyrid-2-one (V, R=CH₃ or

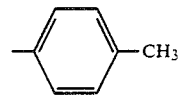

with (II) and an orthoformate ester (R'=CH₃ or C₂H₅) to form the azines (IV). This reaction is carried out at temperatures between 60° and 150° C. in one of the abovementioned solvents, advantageously with azeotropic removal of the resulting alcohol R'OH. In this process variant too it is possible to isolate (IV) and to metallise as described above, or the metallisation is carried out immediately thereafter in the same solvent.

This may be followed as described above by a heat treatment at 100°–250° C. for 2–20 hours.

Finally, it is possible to incorporate the preparation of the aldehyde-anil (III, R=CHNAr) in the synthesis and, in a preliminary step, to condense the pyridone (IV) and optionally substituted aniline with an orthoformate ester (HC(OR')₃; R'=CH₃ or C₂H₅). The hydrazone (II) is then added and reacted as described above to give the red pigment. The reaction of the pyridone can likewise take place at temperatures of 60°–150° C. in one of the abovementioned solvents.

Depending on the reaction temperature in the metallisation and the heat treatment, the pigments of the formula (I) are each obtained in 2 different modifications: at lower temperatures up to about 150° C. the product is the α-modification which, at higher temperatures changes into the blue β-modification.

The α-modification of the pigment of the formula (I) where R=CH₃ is known from EP-A1-74,924.

A further method of preparing the β-modification of the pigments of the formula (I) in accordance with the invention thus consists in the thermal rearrangement of the corresponding α-modification. To this end, the pigments are heated at about 140° to about 250° C., preferably 180°–200° C., in the absence or presence of a diluent for preferably about 2 to about 20 hours, if desired under pressure.

The diluent is preferably water or an organic solvent, for example one of the solvents mentioned above for the reaction of (II) with (III).

The above-described α-modification of the pigment (I) where R=

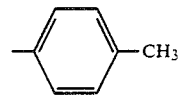

can thus also be regarded as an intermediate for preparing the β-modification.

The azine pigments of the formula (I) are generally produced in the methods described above in sufficient purity and can be used as pigments directly or after suitable finishing.

The pigments of the formula (I), owing to their good properties, are suitable for a very wide range of pigment applications. For instance, they can be used for preparing very fast-pigmented systems, such as mixtures with other substances, formulations, paints, printing inks, coloured paper and coloured macromolecular substances. Mixture with other substances is to be understood as meaning for example mixtures with inorganic white pigments such as titanium dioxide (rutile). Examples of formulations are flushed pastes with organic liquids and if desired preservatives. Paint is to be understood as meaning for example physically or oxidatively drying paints, stoving enamels, reaction paints, two-component paints, emulsion paints for weatherproof coatings and distempers. Printing inks are to be understood as meaning those for paper, textile and sheet metal printing. The new pigments are in particular suitable for pigmenting macromolecular organic substances. The macromolecular substances can be of natural origin, like rubber, can be obtained through chemical modification, like acetyl cellulose, cellulose butyrate or viscose, or be completely manmade products, like polymers, polyaddition products and polycondensates. Examples are plastic materials such as polyvinyl chloride, polyvinyl acetate, polyvinyl propionate, polyolefines, for example polyethylene, or polyamides, superpolyamides, polymers and copolymers of acrylic esters or methacrylic esters, acrylonitrile, acrylamide, butadiene, styrene and polyurethanes and polycarbonates. The substances pigmented with the claimed products can be present in any form. Owing to their high weathering resistance, the pigments of the formula (I) are especially suitable for use in automotive paints, in particular for metallic effect coatings.

The pigments of the formula (I) are outstandingly water-fast, oil-fast, acid-fast, lime-fast, alkali-fast, solvent-fast, cross-painting-fast, cross-spraying-fast, sublimation-fast, heat-resistant, vulcanisation-resistant, high-yielding, readily dispersible in plastic materials and in particular outstandingly light-fast and migration-fast.

EXAMPLE 1a 26.2 g of 1-(cyanophenylcarbamoylmethylene)-3-hydrazonoisoindolenine and 23 g of N-methyl-2-hydroxy-4-methyl-5-cyanopyrid-6-one-3-aldehyde-anil are stirred at 100° C. in 280 ml of dimethylformamide for 1 hour, and 22.6 g of nickel acetate×4H₂O are then added in the course of 15 minutes. The mixture is then stirred at 120° C. for 3 hours, the product which has crystallised in attractive red prismatic needles is filtered off with suction at 80° C. and washed with methanol, and drying produces 42 g=91% of theory of the pigment of the formula

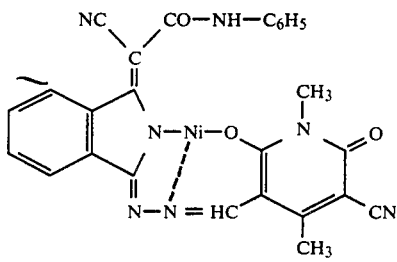

(Ia)

$C_{26}H_{17}N_7O_3$ Ni (533.7) Calculated: C, 58.46; H, 3.19; N, 18.36; O, 8.99; Ni, 11.00. Found: C, 59.30; H, 3.29; N, 18.45, O, 9.12; Ni, 10.85.

The X-ray diffraction diagram by DEBYE-SCHERRER is characterised by the lattice plane spacings (relative intensity): 19.09 (2), 12.79 (2), 11.54 (90), 10.11 (100), 9.70 (100), 8.74 (10), 7.50 (5), 6.49 (70), 5.99 (1), 5.40 (10), 4.82 (8), 4.54 (10), 4.31 (2), 3.92 (20), 3.74 (20), 3.52 (1), 3.44 (60), 3.34 (60), 3.24 (30), 3.00 (20), 2.893 (20), 2.764 (10), 2.626 (5), 2.522 (1), 2.437 (1), 2.372 (5).

EXAMPLE 1b 10 g of the pigment obtained in Example 1a are heated to 200° C. in 75 ml of nitrobenzene in the course of 1 hour and are maintained at that temperature for about 4 hours, during which the pigment changes into long blueish red needles of the β-modification. These are filtered off with suction at 100°–110° C. and are washed with methanol, and drying leaves 9.85 g=98.5% of the β-modification of the pigment of the formula (Ia).

($C_{26}H_{17}N_7O_3$ Ni (533.7) Calculated: C, 58.46; H, 3.19; N, 18.36; O, 8.99; Ni, 11.00. Found: C, 58.89; H, 3.24; N, 18.41; O, 9.07; Ni, 11.00.

The X-ray diffraction diagram by DEBYE-SCHERRER is characterised by the lattice plane spacings (relative intensity): 15.15 (2), 13.33 (100), 12.67 (100), 10.58 (50), 9.17 (60), 7.49 (60), 5.98 (20), 5.53 (1), 5.00 (10), 4.67 (10), 4.51 (10), 4.21 (5), 3.92 (1), 3.67 (10), 3.54 (15), 3.37 (25), 3.26 (1), 3.17 (20), 2.982 (2), 2.877 (3), 2.791 (2), 2.618 (3), 2.550 (3), 2.426 (1), 2.301 (5), 2.151 (1), 2.060 (2), 1.994 (2), 1.943 (3), 1.854 (3).

EXAMPLE 2

6.54 g of 1-(cyanophenylcarbamoylmethylene)-3-hydrazonoisoindolenine and 4.12 g of N-methyl-2-hydroxy-4-methyl-5-cyanopyrid-6-one-3-aldehyde are stirred at 100° C. in 70 ml of dimethylformamide for 1 hour, and 5.64 g of nickel acetate×4H₂O are then added. The mixture is stirred at 120° C. for a further 3 hours, the product which has crystallised in attractive red needles is filtered off with suction at 80° C. and is washed with methanol, and drying leaves 10.7 g=92.9% of theory of the red pigment of the formula (Ia). On heating the pigment obtained at 20020 C. in 75 ml of nitrobenzene for about 4 hours, the result after filtering with suction, washing with methanol and drying is 10.54 g=98.5% of theory of the long blueish red needles of the β-modification of the pigment of the formula (Ia).

EXAMPLE 3

3.55 g of N-methyl-2-hydroxy-4-methyl-5-cyanopyrid-6-one, 2.6 g of trimethyl orthoformate and 2.52 g of aniline are stirred at 120°–125° C. in 75 ml of dimethylformamide for 1 hour, and 6.54 g of 1-(cyanophenylcarbamoylmethylene)-3-hydrazonoisoindolenine are added at 100° C. The mixture is stirred at 100° C. for a further hour, 5.64 g of nickel acetate×4H₂O are added, the temperature is raised to 120° C. for 3 hours, the product which has crystallised in attractive red needles is filtered off with suction at 80° C. and washed with methanol, and drying leaves 10.25 g=89% of theory of the pigment of the formula (I). On heating the pigment obtained at 200° C. in 75 cm³ of trichlorobenzene for some hours, the result is the blueish red needles of the β-modification of the pigment of the formula (Ia) in a yield of 99% of theory.

EXAMPLE 4

5 g of 1-(cyanophenylcarbamoylmethylene)-3-hydrazonoisoindolenine, 2,1 g of trimethyl orthoformate and 2.73 g of N-methyl-2-hydroxy-4-methyl-5-cyanopyrid-6-one are heated to 120°–125° C. in dimethylformamide in the course of 1 hour, and the mixture is stirred at 120°–125° C. for 3 hours. 4.31 g of nickel acetate×4H₂O are then added, the mixture is stirred at 120° C. for 3 hours, the product which has crystallised in attractive red needles is filtered off with suction at 80° C. and washed with methanol, and drying leaves 7.84 g=89% of theory of the red pigment of the formula (I). On heating the pigment obtained at 200° C. in 60 ml of nitrobenzene for 4 hours, the result is, in a 99% of theory yield, the blueish red needles of the β-modification of the pigment of the formula (Ia).

EXAMPLE 5

5 g of 1-(cyanophenylcarbamoylmethylene)-3-hydrazonoisoindolenine, 2.1 g of trimethyl orthoformate and 2.73 g of N-methyl-2-hydroxy-4-methyl-5-cyanopyrid-6-one are heated to 140°–145° C. in 50 ml of nitrobenzene in the course of 1 hour mixture is stirred at 140°–145° C. for 4 hours. 4.31 g of nickel acetate×4-H₂O are then added at 110°–120° C. in the course of 15 minutes, the mixture is stirred at 120° C. for 3 hours, is heated to 200° C. for 1 hour and is then maintained at 200° C. for 4 hours. After the mixture is cooled down to 100°–110° C., the product which has crystallised in blueish red needles is filtered off with suction and washed with methanol, and drying leaves 7.66 g=87% of theory of the β-modification of the pigment of the formula (Ia).

EXAMPLE 6a 24 g of 1-(cyanophenylcarbamoylmethylene)-3-hydrazonoisoindolenine and 27 g of N-(p-tolyl)-2-hydroxy-4-methyl-5-cyanopyrid-6-one-3-aldehyde-anil are stirred at 100° C. in 300 ml of dimethylformamide for 1 hour, and 21 g of nickel acetate×4H₂O are then added in the course of 15 minutes. The mixture is then stirred at 120° C. for 3 hours, the product which has crystallised in long red needles is filtered off with suction at 80° C. and washed with methanol, and drying leaves 44.1 g=91.3% of theory of the scarlet red pigment of the formula (IIa)

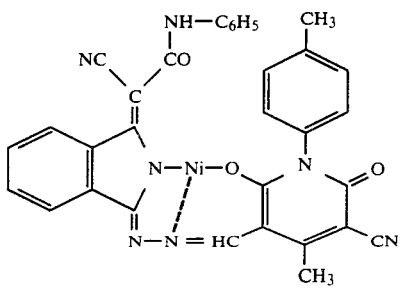

(IIa)

C$_{32}$H$_{21}$N$_7$O$_3$ Ni (609.7): Calculated: C, 62.98; H, 3.44; N, 16.07; O, 7.87; Ni, 9.63. Found: C, 62.21; H, 3.78; N, 16.28; O, 7.95; Ni, 9.71.

The X-ray diffraction diagram by DEBYE-SCHERRER is characterised by the lattice plane spacings (relative intensity): 12.89 (5), 10.92 (100), 9.71 (5), 8.58 (1), 7.77 (5), 6.74 (30), 6.01 (1), 5.50 (1), 4.90 (3), 4.55 (3), 4.19 (3), 3.81 (80), 3.50 (5), 3.32 (3), 3.17 (40), 2.969 (2), 2.767 (2), 2.529 (2), 2.398 (4), 2.206 (4), 2.069 (2), 1.987 (4), 1.868 (3), 1.744 (5).

EXAMPLE 6b 10 g of the pigment obtained in Example 6a are heated to 200° C. in 100 ml of nitrobenzene in the course of 1 hour and are stirred at that temperature for about 10 hours, in the course of which the long red needles of the pigment change into the large red lamellar prisms of the β-modification. The crystals are filtered off with suction at 100°–110° C. and are washed with methanol, and drying leaves 9.7 g=97% of theory of the β-modification of the pigment of the formula (IIa).

C$_{32}$H$_{21}$N$_7$O$_3$ Ni (609.7): Calculated: C, 62.98; H, 3.44; N, 16.07; O, 7.87; Ni, 9.63. Found: C, 62.44; H, 3.65; N, 16.19; O, 7.85; Ni, 9.54.

The X-ray diffraction diagram by DEBYE-SCHERRER is characterised by the lattice plane spacings (relative intensity): 15.75 (70), 13.07 (100), 12.43 (100), 11.05 (3), 9.86 (3), 7.85 (3), 6.43 (25), 6.01 (30), 5.43 (15), 5.09 (8), 4.82 (5), 4.54 (3), 4.42 (3), 4.14 (1), 4.07 (5), 3.90 (8), 3.76 (1), 3.42 (25), 3.28 (60), 3.24 (3), 3.16 (3), 3.03 (8), 2.989 (3), 2.820 (1), 2.588 (3), 2.356 (3), 2.258 (1), 2.111 (3).

EXAMPLE 7

5.2 g of N-(p-tolyl)-2-hydroxy-4-methyl-5-cyanopyrid-6-one, 2.6 g of trimethyl orthoformate and 2.52 g of aniline are stirred at 120°–125° C. in 75 ml of dimethylformamide for 1 hour, and 6.54 g of 1-(cyanophenylcarbamoylmethylene)-3-hydrazonoisoindolenine are added at 100° C. The mixture is stirred at 100° C. for a further hour, 5.64 g of nickel acetate×4H$_2$O are added, the temperature is raised to 120° C. for 3 hours, the product which has crystallised in long red needles is filtered off with suction at 80° C. and is washed with methanol, and drying leaves 12.7 g=96.5% of theory of the pigment of the formula (IIa) of the α-modification. On heating the pigment α-modification thus obtained at 200° C. in 100 ml of nitrobenzene for about 10 hours, the result is, after filtering with suction, washing with methanol and drying, 12.4 g=97.6% of theory of the β-modification of the pigment of the formula (IIa), which has crystallised in large red lamellar prisms.

EXAMPLE 8

5 g of 1-(cyanophenylcarbamoylmethylene)-3-hydrazonoisoindolenine, 2.1 g of trimethyl orthoformate and 4 g of N-(p-tolyl)-2-hydroxy-4-methyl-5-cyanopyrid-6-one are heated to 140°–145° C. in 75 ml of nitrobenzene in the course of 1 hour and are stirred at 140°–145° C. for 4 hours. 4.31 g of nickel acetate×4-H$_2$O are then added at 110°–120° C. in the course of 15 minutes, and the mixture is stirred at 120° C. for 3 hours. Filtering with suction at 120° C., washing with methanol and drying gives 9.1 g=90.5% of theory of the long red needles of the α-modification of the pigment of the formula (IIa).

If the isolation of the α-modification of the pigment is dispensed with and after pigment formation is complete the entire batch is heated at 200° C. for 8–10 hours, the result is 8.9 g=88.5% of theory of the large lamellar prisms of the β-modification of the pigment of the formula (IIa).

EXAMPLE 9 (Use example)

4 g of finely ground pigment in accordance with Example 1b are dispersed in 92 g of a stoving enamel of the following composition:
33% alkyd resin
15% melamine resin
5% glycol monomethyl ether
34% xylene
13% butanol.

The alkyd resin can be any product based on synthetic and vegetable fatty acids, such as coconut oil, castor oil, ricinic oil, linseed oil and others. Instead of using melamine resins it is also possible to use urea resins.

After dispersal has been effected, the pigmented enamel is applied to paper, glass or plastics films or metal foils and is baked at 130° C. for 30 minutes, the result being a brilliant red coating.

On replacing the pigment mentioned in Example 1b by the pigment prepared in Example 6a, the result is a brilliant yellowish red coating. On using the pigment of Example 6b in the same procedure, the result is a brilliant blueish red coating. The coatings have excellent light and weathering fastness and very good cross-painting fastness properties.

EXAMPLE 10 (Use example)

A Red Devil containing 2–3 mm glass balls is used to disperse 6 parts of the pigment of Example 1b in 12 parts of xylene, 4.1 parts of butyl acetate, 0.7 part of n-butanol with 22.5 parts of a 20% strength solution of cellulose acetobutyrate in butyl acetate/xylene (2:1) in the course of 30 minutes. After greasing up the mixture by addition of 10 parts of a saturated polyester resin (Dynapol H 700), 7.3 parts of melamine resin, 8.7 parts of a 20% strength solution of cellulose acetobutyrate in butyl acetate/xylene (2:1), 18 parts of butyl acetate, 1.6 parts of n-butanol and 9.7 parts of xylene, the mixture is dispersed for a futher 5 minutes.

This paint has added to it a dispersion of aluminium paste (60% in an organic solvent (about 1:2)) in such an amount that the ratio of pigment:Al is established at between 80:20 and 1:99.

This paint is brushed on and, when dry, is coated with a clear lacquer which is based on acrylate/melamine resin and can contain further auxiliaries, such as, for example, UV absorbers, and is baked.

The result is a red metallic effect coating having a brilliant colour and excellent weathering fastness.

Similar brilliant red metallic effect coatings are obtained on replacing the pigment mentioned in Example 1b by the pigments prepared in accordance with Example 6a or 6b.

EXAMPLE 11

0.2 g of the pigment obtained in Example 1b is dispersed at 160° C. in 65 g of stabilised PVC and 35 g of diisooctyl phthalate using mixing roll mills and is rolled out at 160° C. The result is a red film of very good light and migration fastness.

Tristimulus Values and Hue Angle of the Pigments of Examples 1 and 6

10 g of pigment and 100 g of sodium chloride are milled together for 8 hours in an oscillatory mill containing steel balls, the mill base is then stirred up with hot water, and the solids are filtered off, are washed thoroughly with water and are dried at 50° C. 0.2 g each of the milled pigment is incorporated into a plasticised PVC film as described in Example 11.

The pigmented film is reflectance-measured with gloss before a white background. The reflectance measurements are used in the manner of DIN No. 5,033 to calculate the standard tristimulus values and the hue angle $h_{ab}°$ for the D 65 illuminant and the 10° standard observer.

|  | X | Y | Z | Hue angle |
|---|---|---|---|---|
| Example 1a | 32.65 | 19.88 | 4.18 | 39.9° |
| Example 1b | 26.64 | 15.36 | 4.09 | 33.7° |
| Example 6a | 32.40 | 20.04 | 4.13 | 41.0° |
| Example 6b | 25.75 | 15.00 | 4.25 | 33.0° |

We claim:

1. Pigments which, in one of their tautomeric forms, have the formula

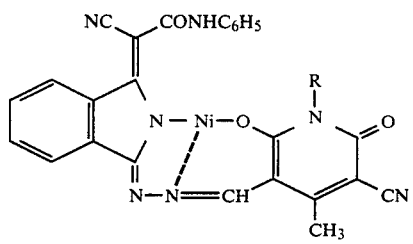 (I)

in which
R signifies —CH₃ or

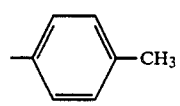

and which, in the event that R is —CH₃, are present in the β-modification which is characterised by the lattice plane spacings d/Å 13.33, 12.67, 9.17 and 15.15 having the relative intensities 100, 100, 60 and 2%.

2. Pigment according to claim 1 where R=—CH₃, characterised by the standard tristimulus values (by DIN No. 5,033) x=26.64, Y=15.36 and Z=4.09 and a hue angle of 33.7°.

3. β-Modification of the pigment according to claim 1 where R=

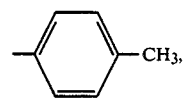

characterised by the lattice plane spacings d/Å 13.07, 12.43, 15.75 and 3.28 having the relative intensities 100, 100, 70 and 60%.

4. Pigment according to claim 1 where R=

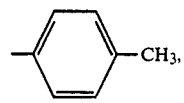

characterised by the standard tristimulus values (by DIN No. 5,033) X=25.75, Y=15.00 and Z=4.25 and a hue angle of 33.3°.

5. β-Modification of the pigment according to claim 1 where R=

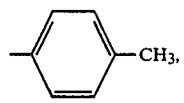

characterised by the lattice plane spacings d/Å 10.92, 3.81, 3.17, 12.89 having the relative intensities 100, 80, 40 and 5%.

6. Pigment according to claim 1 where R=

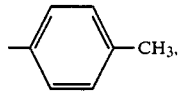

characterised by the standard tristimulus values (by DIN No. 5,033) X=32.40, Y=20.04 and Z=4.13 and a hue angle of 41.0°.

7. Process for preparing the β-modification of pigments according to claim 1, characterised in that the α-modification of the pigments is heated to 140°–250° C. in the absence or presence of a diluent.

8. Process for pigmenting macromolecular organic substances, characterised in that pigments according to claim 1 are used.

9. Process for pigmenting automotive paints, characterised in that pigments according to claim 1 are used.

* * * * *